BEST AVAILABLE COPY
N. Hodge,
Bilge Water Discharging.
№ 2229. Reissued Feb. 1, 1853.
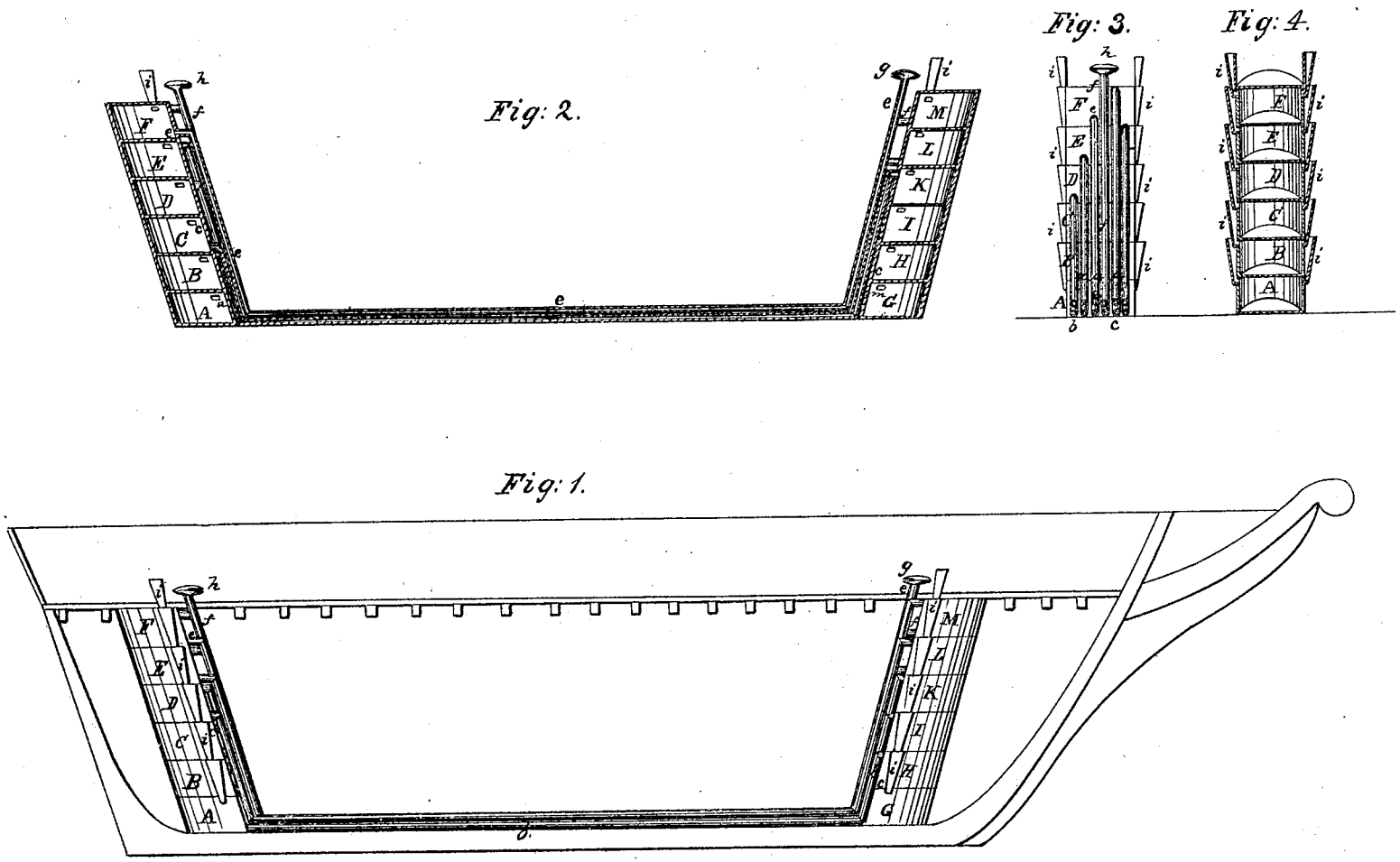
N. PETERS, PHOTO-LITHOGRAPHER, WASHINGTON, D. C.

BEST AVAILABLE COPY

UNITED STATES PATENT OFF

NEHEMIAH HODGE, OF NORTH ADAMS, MASSACHUSET

IMPROVEMENT IN APPARATUS FOR ELEVATING AND DISCHARGING BILGE-WATE

Specification forming part of Letters Patent No. 9,344, dated October 19, 1852; Reissu
February 1, 1853.

*To all whom it may concern:*

Be it known that I, NEHEMIAH HODGE, of North Adams, in the county of Berkshire and State of Massachusetts, have invented a new and useful Improvement in Machinery for Discharging Water from the Holds of Navigable Vessels; and I do hereby declare that the following description, taken in connection with the accompanying drawings, figures, letters, and references thereof, forms a full and exact specification of my said invention, setting forth the nature thereof and the manner in which the same is to be performed.

Of the said drawings, Figure 1 denotes a longitudinal section of a navigable vessel and my invention as applied thereto. Fig. 2 is a longitudinal vertical section of the said invention. Fig. 3 is a transverse and central section of it. Fig. 4 is a cross-section taken down through the ventilators of one series of its water-chambers.

In opposite parts of the hold of a ship or navigable vessel—that is to say, at or near the bow and stern or other parts—I arrange two series of chambers or close cisterns, as seen at A B C D E F and G H I K L M in Figs. 1 and 2. I do not confine my invention to any particular number of such chambers in each series so long as I make use of such number as shall answer the purpose. The chambers of each series I arrange the one above the other. Through the upper part of the side of the lowest chamber of one of the series of these chambers—viz., the chamber A—I make one or more openings or holes, *a*, and from out of the lower part of the said chamber A a pipe, *b*, is to be carried and made to extend to and open into the upper part of the chamber H of the other series, such chamber H being arranged with its bottom on or about on a level with the top of the chamber A. Out of the side of the chamber H and close down to the bottom of it another pipe, *c*, is made to open and to pass toward and open into the upper part of the chamber C, or that chamber which in the next series is situated next above the chamber from the lower part of which the pipe is led. So with regard to all the chambers. Each chamber of each of the said series is to be connected with that chamber of the other series which is placed next above its level, and this by a pipe leading out of the first chamber at or near its bottom and into the second chamb its top.

Each of the upper chambers, F a pipe, *e* or *f*, leading out of it nea and toward the opposite series o and carried upward to some dis the said series of chambers, as drawings. The said pipe has a mouth, *g* or *h*, applied to its up each chamber one or more venti *i*, are applied, so as to open out of it and to rise and open above it ne on a level with the top of the cl above it, as seen in the drawing of such ventilating-pipes being to flow into or out of their respectiv without loss of water through suc so as to enable the apparatus to functions without interruption. T mouths *g h* should extend above the hold of the vessel.

During the plunging or rolling the vessel the apparatus above de be so thrown out of level that whi of its chambers are at one mome above the level of the other series or the next moment the latter se raised above the level of the forme ing the case, it will be seen that whe ber A is depressed so as to carry below the level of the water in the vessel the said water will run in chamber; also, that when the s A is raised by the movement o above the level of the water an chamber H water will run from A through the pipe *b* and be d the mere power of gravity into u H. During the next roll of the opposite direction the chamber elevated above the chamber C th will run from the chamber H t connecting-pipe and into the cha ing the next roll or pitch of t water passes from the chamb chamber K. During the next site direction the elevation of and consequent depression o causes the said water to flow ber K into the chamber E. roll or pitch the water in a pass from the chamber E int

BEST AVAILABLE COPY xt roll in an opposite direction the chamber M through the pipe arged out of its mouth and upon ıto the sea.

to the remaining chambers, the viz., G—has an opening, *m*, made ıde near its top, such opening be water from the hold to pass into ı rocking or plunging movements Such water during the succeed- of the vessel will be caused to ıamber B into the chamber I, ıer I into chamber D, and from r D into the chamber L, and from r L into the chamber F, and finally id chamber through the pipe *e*, and ;ed out the mouth of the same. : will be taken from the hold of the by the reciprocating, rocking, or ovements of the vessel and the ac- vity be elevated up to and be dis- on the deck, from which it may run e scuppers and into the sea. An to produce this effect would thus consist of a system and arrange- sels, A H C K E M or G B I D L ecting-pipes, discharging-pipe, and o the lower vessel and ventilation- scribed. Two systems may be com- een in the drawings.

:s not what may be the number of n each series of the two belonging em. This must be left to circum- Nor does it matter in what part of a system is arranged—that is to say, be made to extend longitudinally or y across the hold—the reciprocating movements of the vessel, combined with the action of gravity, will produce the elevation and discharge of water, essentially as above stated.

I do not intend to confine my invention to the precise form or forms of its parts, as above described, or as represented, but intend to vary the same, or any of the same, in any manner while I do not change the principle or novel feature or character claimed as new or as my said invention.

I lay no claim to the invention of the system of "pendulum or swinging gutters," invented by M. Morel and described in Belidor's Treatise on Hydraulics, nor the hydraulic machine of A. De Courdemoy, as described at page 205 of the first volume of Machines and Inventions approved by the Royal Academy of France, (printed in 1735;) but

What I claim as my invention is—

The combination of a system of two series of chambers, connecting-pipes, discharging-pipe, receiving hole or orifice, and ventilating-pipes, as arranged, connected, applied to the hold of a navigable vessel, and made to operate during the rolling or pitching movements thereof, substantially in manner and for the purpose of elevating and discharging water therefrom, as hereinabove set forth.

In witness whereof I have hereto set my hand this 27th day of October, in the year of our Lord 1852.

NEHEMIAH HODGE.

Witnesses:
R. H. EDDY,
GEO. W. CUTLER.